United States Patent [19]

Christoph et al.

[11] Patent Number: 4,606,663
[45] Date of Patent: Aug. 19, 1986

[54] SWITCHABLE PAPER TRANSPORT DEVICE FOR SINGLE SHEETS AND CONTINUOUS PAPER IN PRINTERS

[75] Inventors: Günter Christoph, Munich; Heinz Stickel, Gröbenzell, both of Fed. Rep. of Germany

[73] Assignee: Siemens Aktiengesellschaft, Berlin and Munich, Fed. Rep. of Germany

[21] Appl. No.: 669,561

[22] Filed: Nov. 8, 1984

[30] Foreign Application Priority Data

Nov. 29, 1983 [DE] Fed. Rep. of Germany ....... 3343196

[51] Int. Cl.$^4$ ............................................. B41J 11/51
[52] U.S. Cl. ................................. 400/605; 400/568; 400/569; 400/616; 400/618; 400/636
[58] Field of Search ............... 400/545, 568, 569, 571, 400/605, 607, 608.4, 616, 616.2, 617, 618, 624, 625, 634, 636

[56] References Cited

U.S. PATENT DOCUMENTS

| | | | |
|---|---|---|---|
| 3,753,483 | 8/1973 | Lundquist et al. | 400/605 |
| 4,160,606 | 7/1979 | Caenazzo | 400/616.2 |
| 4,347,788 | 9/1982 | Dufour | 101/415.1 |
| 4,360,279 | 11/1982 | Sugiura | 400/618 |

FOREIGN PATENT DOCUMENTS

| | | |
|---|---|---|
| 2642818 | 3/1978 | Fed. Rep. of Germany . |
| 7815374 | 9/1978 | Fed. Rep. of Germany . |
| 8226271 | 11/1982 | Fed. Rep. of Germany . |
| 3149667 | 6/1983 | Fed. Rep. of Germany . |
| 558840 | 1/1944 | United Kingdom . |

*Primary Examiner*—Edgar S. Burr
*Assistant Examiner*—David A. Wiecking
*Attorney, Agent, or Firm*—Mark H. Jay

[57] ABSTRACT

There is disclosed a paper transport device for printers. The device transports either single sheets or continuous paper through a printer in such a manner that switching between single sheet feed or continuous paper feed does not degrade print quality. When feeding single sheets, the platen determines the paper feed rate and is driven at a first circumferential speed. When feeding continuous paper, the platen is driven at a second and faster circumferential speed, which is slightly greater than the rate at which the paper tractor feeds the paper to the platen.

3 Claims, 3 Drawing Figures

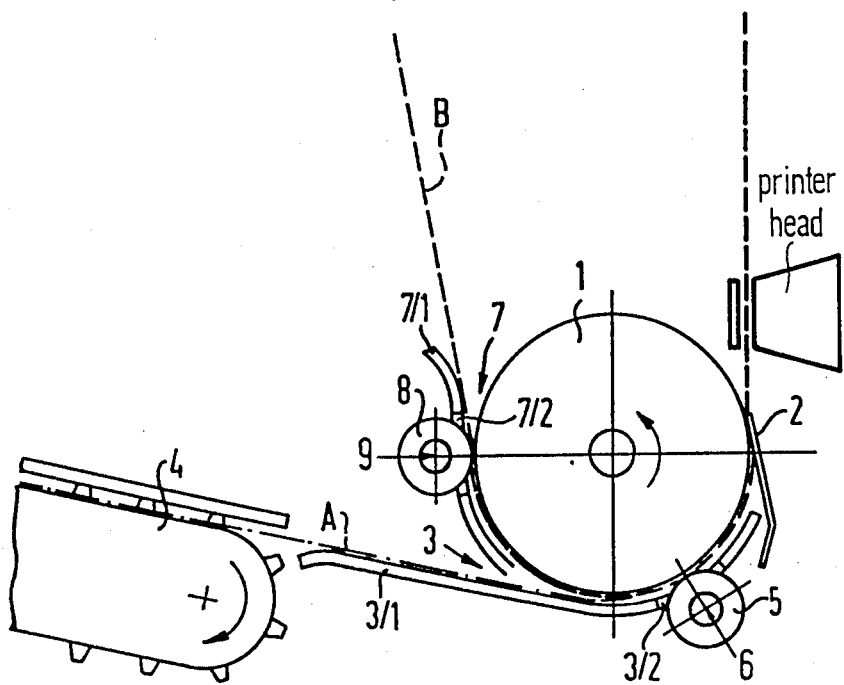

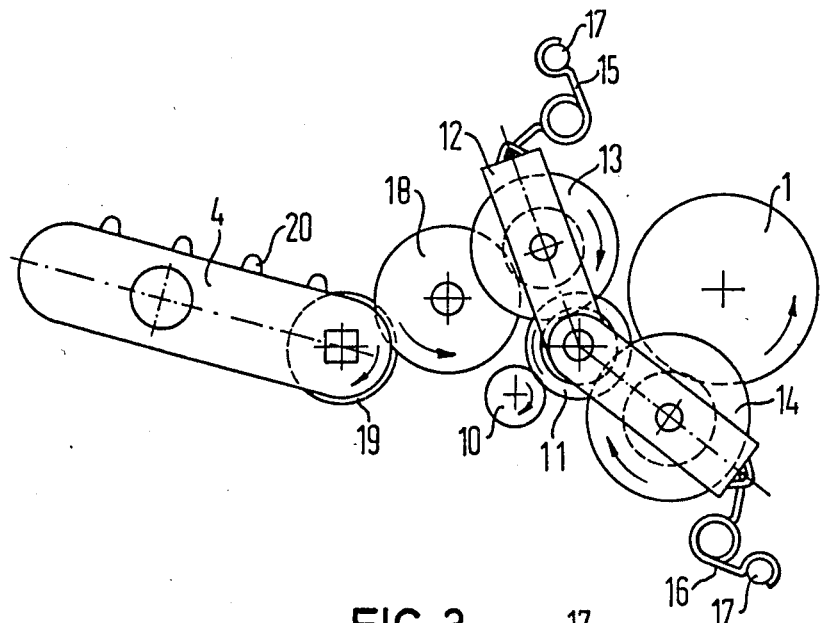
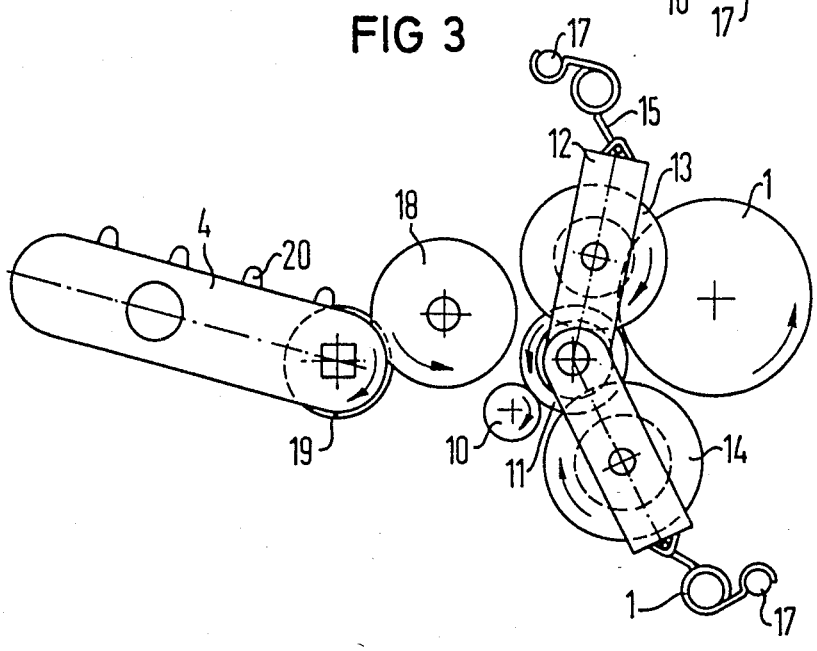

SWITCHABLE PAPER TRANSPORT DEVICE FOR SINGLE SHEETS AND CONTINUOUS PAPER IN PRINTERS

BACKGROUND OF THE INVENTION

The invention relates to a paper transport device for feeding single sheets of paper on continuous forms.

Paper transport devices of this kind have already been suggested and are being used successfully.

For instance, DE-PS No. 31 49 667 describes an attachable transport device for margin-perforated record carriers which is attached to a printer normally intended for single sheets and which contains a tractor drive. Both the single sheets and the continuous paper, if needed with transport device attached, are conducted around the platen by one common paper channel. The tractor drive is designed so that the continuous paper is pulled across the platen. In the printers mentioned above, the continuous paper as well as the single sheets are guided around the platen in the paper guide channel by paper bail rollers. The various rollers are engaged in both continuous paper and single sheet operation.

In addition, it is common practice for the feeding of single sheets to use automatic "feeders". Feeders include cassettes containing a paper supply, and precede the transport device for continuous paper in the printer. The paper to be printed on is automatically taken from the feeder as needed and fed to the printer or platen.

To make both removal of single sheets from the feeder and precise re-depositing of the paper reliable in such automatic operation, the contact pressure of the paper bail rollers must be relatively great, so that no offsetting between record carrier and platen will occur.

On the other hand, if continuous paper is used, a tractor drive has already been suggested in which the paper tractor is mounted upstream of the platen in the direction of paper transport, feeding the continuous paper by pushing it. The platen is essentially a mere guide for the continuous paper, and to make the paper pass through cleanly, the circumferential speed of the platen is set slightly greater than the tractor's feed rate.

This type of feed is inappropriate for feeding single sheets because in single sheet operation the paper feed rate depends essentially on the circumferential speed of the platen. This is disadvantageous particularly when graphics are to be printed, because the transition from continuous paper to single sheets leads to a distortion of the graphic representation.

SUMMARY OF THE INVENTION

It is an object of the invention to design a paper transport device so that both single sheets and continuous paper can be printed on without degrading the printed image when changing between single sheet operation and continuous paper operation.

In accordance with the invention, the platen is driven during single sheet operation at a first circumferential speed (which determines the paper feed rate) and driven at a second circumferential speed during continuous paper operation. This second circumferential speed is slightly greater than the feed rate of the paper tractor. As a result, malfunctions and quality impairments do not occur when changing between continuous paper and single sheet operation.

Advantageously, one common, central drive is associated with the switching mechanism for the platen and the paper tractor. This results in a particularly simple, reliable and economical design of the entire paper transport device.

The invention will be better understood with reference to the following drawings and the detailed description of preferred embodiments.

BRIEF DESCRIPTION OF THE DRAWINGS

Exemplary and non-limiting preferred embodiments of the invention are shown in the drawings, in which:

FIG. 1 is a schematic, sectioned view of the paper transport portion of a preferred embodiment of the invention;

FIG. 2 is a schematic view of the feed mechanism of the preferred embodiment in position for continuous paper transport; and FIG. 3 is a schematic view of the feed mechanism of the preferred embodiment in position for single sheet transport.

DETAILED DESCRIPTION OF PREFERRED EMBODIMENTS

The paper transport device for a typewriter or office machine printer shown schematically in FIG. 1 contains a motor-driven platen 1 which moves the record carrier in accordance with the linewise printing progress of e.g. a dot matrix printing head (not shown). The record carrier B is kept flat around the point of impact by a spring paper bail 2. The printer shown is designed both for single sheet operation and for continuous paper operation. For this purpose, two feed-in channels for continuous paper and single sheets end in the paper guide channel which partly surrounds the platen 1. The first feed-in channel 3 for continuous paper is tangentially flush with the platen and ends in the paper guide channel. The first feed-in channel 3 consists of a sheet metal paper guide 3/1 spaced from the platen, there being disposed in the extension of said sheet metal paper guide 3/1 a paper tractor 4 which represents the actual drive for the continuous paper A provided with margin perforations and whose feed rate determines the paper feed rate of the continuous paper A.

Coordinated with the first feed-in channel 3 with its sheet metal paper guide 3/1 are three sprung bail rollers 5, of which only one is shown. The paper bail rollers 5 are arranged in known manner in one line parallel to the shaft of the platen 1 and may be mounted on a common shaft. They are sprung and push the record carrier against the platen 1 under the action of a suitable spring force 6. In the areas of the bail rollers 5 the sheet metal paper guide 3/1 is interrupted by cutouts 3/2.

When operating with continuous paper A, the paper is caused to slide along the sheet metal paper guide 3/1 by the synchronized tractor 4 until the paper is pressed by the bail rollers 5 against the platen 1. Due to this pressure, the continuous paper is transported jointly by the tractor 4 and the platen 1, the paper transport rate being determined by the feed rate of the tractor 4, however. So as to preclude the formation of paper loops between the tractor and the platen, the circumferential speed of the platen is slightly greater than the feed rate of the tractor 4, which can be effected by a transmission described later, or by an appropriate electronic control circuit (not shown). This assures that the continuous paper A is transported around the platen 1 under tension. Since the tractor 4 determines the feed rate, it must be possible for slack to appear between the platen 1 and the continuous paper stack A. The contact pressure of the bail rollers 5 is therefore designed so that the paper can still slip on the platen 1, yet is reliably taken along by the platen 1. This means that the contact pressure must be adapted to the friction between the paper and the platen 1. The location of the paper bail rollers 5, mounted on a common shaft in this case, is fixed so that the continuous paper A can be pushed without problems by the tractor 4 in the area formed by the sheet metal paper guide 3/1 and the circumference of the platen 1, which area is called the roller wedge.

In order to be able to feed single sheets B, a second feed-in channel 7 is provided. As viewed in the transport or circumferential direction of the platen 1, this second feed-in channel 7 is disposed ahead of the first feed-in channel 3 and is located below a known, automatic guiding mechanism for single sheets (not shown), from which the single sheets B are taken during the printing operation. The second feed-in channel 7 contains one single, centrally disposed pressure roller 8 which pushes the single sheet to be fed in against the platen 1 under a spring force 9. To facilitate the introduction of the single sheets B, a sheet metal paper guide 7/1 may be provided analogously to the paper guide 3/1, having a central opening 7/2 to receive the paper bail roller 8.

The use of a single paper bail roller 8 adjacent the center of platen 1 has the advantage that when very thin single paper sheets are used, the paper cannot buckle because the single paper bail roller 8 guides the paper. It is, of course, also possible to provide several paper bail rollers. The contact pressure of these paper bail rollers is such that no slack can occur between the single sheet and the platen 1 so that the single paper sheet B of the automatic feeding device can be pulled out safely. The location of these paper bail rollers 8 in the second feed-in channel 7 is selected so that the single sheets B can be gripped as reliably as possible. For this purpose, the sheet metal paper guide 7/1 is bent in its upper part so that the single sheets 8 can be guided readily into the roller wedge formed by the sheet metal paper guide 7/1 and the outside diameter of the platen 1.

If a multipart form is to be printed it is advantageous to provide one central, barrel-shaped bail roller in the area of the first feed-in channel 3 instead of several bail rollers 6. This reduces the danger of the various layers shifting with respect to each other.

To reduce friction and wear, the bail rollers 8 can pivot in the area of the second feed-in channel 7 so that, in continuous paper operation, only the bail rollers in the first feed-in channel 3 are engaged.

The actual drive mechanism of the platen 1 and tractor 4 including the associated switching mechanism is shown in FIGS. 2 and 3. It consists of a central drive motor (not shown) which drives a drive pinion 10. Constantly meshing with this drive pinion 10 is a secondary drive gear 11. Drive gear 11 is mounted in a pivoting rocker 12 and the rocker 12 pivots about the axis of the drive gear 11. The arms of the rocker 12, in turn, support secondary drive gears 13 and 14 respectively, which are again in constant engagement with the drive gear 11. The rocker 12 itself is linked at the ends of its arms, via springs 15 and 16, to fixed elements 17 of the printer frame (not otherwise shown). The springs 15 and 16 are spiral shaped and engage the elements 17 of the frame and the arms of the rocker 12 so that the rocker 12 is always stable in one of the configurations shown in FIGS. 2 and 3, the change between such configurations being accomplished by a lever connected to the pivot shaft of the rocker 12 and omitted to clarify the Figures. This lever can be replaced by an electromagnetic or other switching device (not shown) which pivots the rocker 12 according to the desired operating mode: single sheet or continuous paper. This pivoting motion can also be accomplished automatically through the printer control system (not shown).

This embodiment operates as follows:

The configuration shown in FIG. 2 corresponds to continuous paper feed. Via an idler gear 18, the secondary gear 13 engages a drive gear 19 of the tractor 4. The drive gear 19 is in turn coupled to the sprocket band 20 which engages the margin perforation of the continuous paper. At the same time, the secondary gear 14 is positively connected to the platen 1 or to a drive gear fixed to the platen. Both the tractor 4 and the platen 1 are driven by the central drive pinion 10, the various gears turning as shown by the arrows. The transmission ratio of the various gears relative to each other is selected so that a circumferential speed of the platen 1 is slightly greater than the resultant feed rate of the tractor 4. The switching mechanism may be designed either with gears or friction wheels. There should be no backlash between the individual gears.

By means of the unshown lever driving the rocker 12 or by a suitable alternative mechanism, the rocker 12 is brought into the configuration shown in FIG. 3 when changing over to single sheet operation. In that position the positive connection between the secondary drive gear 13 and the paper tractor 4 is broken and the secondary drive gear 13 engages the platen 1 or the drive gear driving the platen 1. At the same time, the second secondary drive gear 14 is disengaged from the platen 1. Hence the platen 1 is advanced by the pinion 10 in conjunction with the primary drive gear 11 and the first secondary drive gear 13. The transmission ratio of the three drive gears 10, 11, 13 in connection with the platen 1 is chosen so that the circumferential speed of the platen 1 again corresponds to the original paper feed rate, i.e. is slower than in the continuous paper operating mode and corresponds to the paper feed rate of the paper tractor 20 and hence to the paper feed rate to which the printing head control is tuned. Accordingly, the platen 1 is operated at exactly the speed required for accurate graphics printing.

Those skilled in the art will understand that changes can be made in the preferred embodiments here described, and that these embodiments can be used for other purposes. Such changes and uses are within the scope of the invention, which is limited only by the claims which follow.

What is claimed is:

1. A paper transport mechanism for feeding single sheets and continuous paper to a printer head in a manner that paper feed is switchable between single sheets and continuous paper without degradation of printing thereon, comprising:

(a) a platen;
(b) a tractor operating to feed contionus paper to the platen at a paper feed rate, said tractor and platen being centrally driven;
(c) means for feeding single sheets of paper to the platen;
(d) means for frictionally engaging the platen with paper fed thereto; and
(e) a switching mechanism coordinating operation of said platen, tractor, feeding means and frictionally engaging means in a manner that when said switching mechanism is adjusted to feed single sheets of paper to the printer head, platen speed is established at a first circumferential speed and determines the paper feed rate, and when said switching mechanism is adjusted to feed continuous paper to the printer head, the tractor determines the paper feed rate and platen speed is established at a second circumferential speed which is different from said first circumferential speed and is greater than the paper feed rate established by the tractor, said switching mechanism comprising (e1) a primary drive gear, (e2) first and second secondary drive gears which are constantly engaged with the primary drive gear, (e3) first and second arms connected respectively to the first and second secondary drive gears and moving them between engaging and disengaging positions with other gears while maintaining engagement with the primary drive gear, and (e4) means for moving the first and second arms between a first configuration in which the first secondary drive gear is engaged in driving relation with the tractor and the second secondary drive gear is engaged with the platen and a second configuration in which the first secondary drive gear is engaged with the platen and the second secondary drive gear is disengaged from the platen.

2. The mechanism of claim 1, further including an idler gear which is in constant engagement with the tractor and is engaged with the first secondary drive gear when the switching mechanism is in the first configuration.

3. The mechanism of claim 1, further including first and second springs respectively connecting the first and second arms to fixed points in a manner that the switching mechanism is stable in each of said first and second configurations.

* * * * *